Patented Sept. 8, 1925.

1,552,796

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.   Application filed February 8, 1923.   Serial No. 617,863.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Compositions, of which the following is a full, clear, and exact specification.

This invention relates to cellulose ether compositions. One object of the invention is to provide cellulose ether compositions which will have the desired properties in the manufacture of film, in the application of varnishes and in other plastic arts. Another object of my invention is to provide strong, flexible, transparent films. Other objects will hereinafter appear.

In U. S. Patent, No. 1,188,376, Lilienfeld, June 20, 1916, there are disclosed alkyl ethers of cellulose. Certain of these are practically insoluble in water, and the preferred form of my invention relates to ethers having that property, although it is not limited thereto. While such ethers form thin solutions in the lower monohydroxy aliphatic alcohols, or in ethyl lactate, it has been found that the single solvents by themselves do not dissolve a sufficient proportion of the ethers to make thick or strong flowable compositions or dopes. My invention enables such thick compositions to be prepared, as well as the thinner ones employed in the manufacture of varnishes and lacquers.

I have discovered that the solvent action of ethyl lactate and the solvent action of the lower monohydroxy aliphatic alcohols with respect to cellulose ethers may be greatly increased by mixing these liquids. In other words, the combining of these substances brings out latent solvent powers. For example, in the preferred form of my invention, I mix equal parts by weight of methyl alcohol and ethyl lactate. For film manufacture I may dissolve 1 part by weight of cellulose ether (say water-insoluble ethyl cellulose) in 7 parts of the above described mixture. This gives a flowable composition which may be used in the manufacture of photographic film base by the customary manipulations in the usual apparatus. Of course, such a thick composition or dope may be thinned down by the use of more solvent to any desired degree in varnish manufacture, as will be understood by those skilled in the art. The separate solvents will not by themselves produce suitable dopes of 1 to 7 strength.

The other lower monohydroxy aliphatic alcohols may be employed in the same way as methyl alcohol either singly or mixed. By the term "lower monohydroxy aliphatic alcohols" I mean those having less than 6 carbon atoms. In the favored form of my invention I greatly prefer, however, to use methyl alcohol instead of the higher members of the series. Other substances which impart additional suppleness or incombustibility or other qualities to the film may be added to the dope, such, for example, as triphenyl or tricresyl phosphate, monochlornaphthalene, camphor, etc.

Because of its relatively high boiling point, ethyl lactate tends to remain in the deposited or flowed films in considerable quantities after the alcohol evaporates. Its presence imparts flexibility and other useful qualities to the product. All of the hereinabove recited ingredients are of the ordinary commercial type, being sufficiently purified for the process of film or varnish manufacture so as to give dopes yielding films or coatings having the proper relative freedom from color.

Having thus described my invention, what I claim as new and desire to secure by Letters Patent is:

1. A composition of matter comprising cellulose ether and ethyl lactate, the ingredients being homogeneously mixed in unprecipitated form.

2. A composition of matter comprising cellulose ether, ethyl lactate and a lower monohydroxy aliphatic alcohol, the ingredients being homogenously mixed in unprecipitated form.

3. A composition of matter comprising cellulose ether dissolved in a mixture of ethyl lactate and methyl alcohol.

4. A composition of matter comprising water insoluble ethyl cellulose dissolved in a mixture of equal parts by weight of ethyl lactate and methyl alcohol.

5. A viscous flowable film-forming composition comprising 1 part by weight of water-insoluble ethyl cellulose dissolved in approximately 7 parts by weight of a mixture of ethyl lactate and methyl alcohol.

6. As an article of manufacture, a deposited or flowed film of cellulose ether containing ethyl lactate.

7. As an article of manufacture, a flowable transparent film comprising water-insoluble ethyl cellulose and ethyl lactate.

Signed at Rochester, New York, this 26th day of January, 1923.

JOHN M. DONOHUE.